(12) United States Patent
Hindi et al.

(10) Patent No.: US 8,554,382 B2
(45) Date of Patent: Oct. 8, 2013

(54) MULTIVARIABLE CONTROL OF REGULATION AND FAST DEMAND RESPONSE IN ELECTRICAL GRIDS

(75) Inventors: Haitham A. S. Hindi, Menlo Park, CA (US); Daniel H. Greene, Sunnyvale, CA (US); Caitlin L. Laventall, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 404 days.

(21) Appl. No.: 12/892,780

(22) Filed: Sep. 28, 2010

(65) Prior Publication Data

US 2012/0078434 A1    Mar. 29, 2012

(51) Int. Cl.
*G05D 3/12*    (2006.01)

(52) U.S. Cl.
USPC ............................. 700/291; 700/29; 700/295

(58) Field of Classification Search
USPC .................. 700/29–33, 89, 291, 295, 296
See application file for complete search history.

(56) References Cited

U.S. PATENT DOCUMENTS

| 8,001,960 B2 * | 8/2011 | Gilon et al. .................... 126/600 |
| 2011/0071693 A1 * | 3/2011 | Sun et al. ........................ 700/291 |

* cited by examiner

*Primary Examiner* — Carlos Ortiz Rodriguez
(74) *Attorney, Agent, or Firm* — Shun Yao; Park, Vaughan, Fleming & Dowler LLP

(57) ABSTRACT

One embodiment of the present invention provides a system for resolving energy imbalance within an electrical grid. During operation, the system receives an imbalance signal and current outputs from a regulation service subsystem and a demand response subsystem. Subsequently, the system generates control signals for controlling future outputs of the regulation service subsystem and the demand response subsystem based on the imbalance signal and the current outputs, and applies the generated control signals to the regulation service subsystem and the demand response subsystem.

19 Claims, 8 Drawing Sheets

MULTIVARIABLE CONTROL OF REGULATION AND FAST DEMAND RESPONSE IN ELECTRICAL GRIDS

RELATED APPLICATION

The subject matter of this application is related to the subject matter of the following applications:

U.S. patent application Ser. No. 12/406,006, entitled "TECHNIQUE FOR AGGREGATING LOADS WITH TIME-VARYING OPERATING CYCLES," by inventors Jay T. Johnson, Daniel H. Greene, and Haitham Ali Salem Hindi, filed 17 Mar. 2009; and U.S. patent application Ser. No. 12/406,003, entitled "TECHNIQUE FOR AGGREGATING AN ENERGY SERVICE," by inventors Anthony Papavasiliou, Haitham Ali Salem Hindi, and Daniel H. Greene, filed 17 Mar. 2009;

the disclosures of which are incorporated by reference in their entirety herein.

BACKGROUND

1. Field

The present disclosure relates to the control of an electrical grid. More specifically, the present disclosure relates to a method for controlling an electrical grid by simultaneously using both the supply-side regulation and the demand-side fast demand response.

2. Related Art

In traditional electricity markets, economic mechanisms are frequently used to arrive at accurate incentives and to dispatch services. For example, an operator of a power system, such as an independent system operator (ISO), may request bids up to 24 hours in advance of a desired service. In response to the request, one or more suppliers, such as a power plant, may bid to supply power or ancillary services (such as regulation, load following, spinning reserve, non-spinning reserve, replacement reserve and/or other services that help maintain power system stability in response to unanticipated variations in the supply and demand of electricity). Based on the received bids, the ISO may select or dispatch the services it needs to operate the power system or grid. In the case of contingency services (e.g., spinning reserve), the ISO may dispatch the services and compensate the corresponding suppliers for being available, even if these suppliers are not subsequently required to provide power.

In an electrical grid, electricity consumption and production must balance at all times; any significant imbalance could cause grid instability or severe voltage fluctuations, resulting in failures within the grid. In the current electrical grid architecture, system operators rely heavily on ancillary regulation services to resolve the energy imbalance between supply and demand. These regulation services are provided on multiple scales of time and power, traditionally on the supply side by utilities and power generation companies. However, these regulation services are expensive and can be slow to ramp up. Moreover, the supply side regulation services are often constrained by limited capacity and ramp rates.

SUMMARY

One embodiment of the present invention provides a system for resolving energy imbalance within an electrical grid. During operation, the system receives an imbalance signal and current outputs from a regulation service subsystem and a demand response subsystem. Subsequently, the system generates control signals for controlling future outputs of the regulation service subsystem and the demand response subsystem based on the imbalance signal and the current outputs, and applies the generated control signals to the regulation service subsystem and the demand response subsystem.

In a variation on this embodiment, generating control signals involves implementing a model predictive control (MPC) scheme.

In a further variation, the MPC scheme includes: constructing a time-varying function over a predetermined time horizon based on the imbalance signal, unknown future outputs from the regulation service subsystem and the demand response subsystem, and/or unknown future control signals for the regulation service and the demand response; constructing a number of constraints associated with the unknown future outputs and unknown future control signals; and solving the unknown future control signals by minimizing the time-varying function subject to the constraints.

In a further variation, the time-varying function includes a tracking error corresponding to the difference between the imbalance signal and the sum of the outputs of the regulation service subsystem and the demand response subsystem.

In a further variation, the time-varying function includes one or more of: a total resource consumption of the demand response subsystem, which corresponds to the outputs of the demand response subsystem; a weighted input cost of the regulation service subsystem, which corresponds to the weighted control signal for the regulation service subsystem; and a weighted input cost of the demand response subsystem, which corresponds to the weighted control signal for the demand response subsystem.

In a further variation, the constraints include one or more of the following: input hold rates of the regulation service subsystem and the demand response subsystem, maximum outputs of the regulation service subsystem and the demand response subsystem, maximum values of the control signals for the regulation service subsystem and the demand response subsystem, a total resource consumption of the demand response subsystem, input costs of the regulation service subsystem and the demand response subsystem, and total variation of outputs of the demand response subsystem.

In a further variation, the hold rate of the regulation service subsystem is less than the hold rate of the demand response subsystem.

In a further variation, the maximum values of the control signals correspond to the maximum ramp rates of the regulation service subsystem and the demand response subsystem.

DETAILED DESCRIPTION

Figure 1:
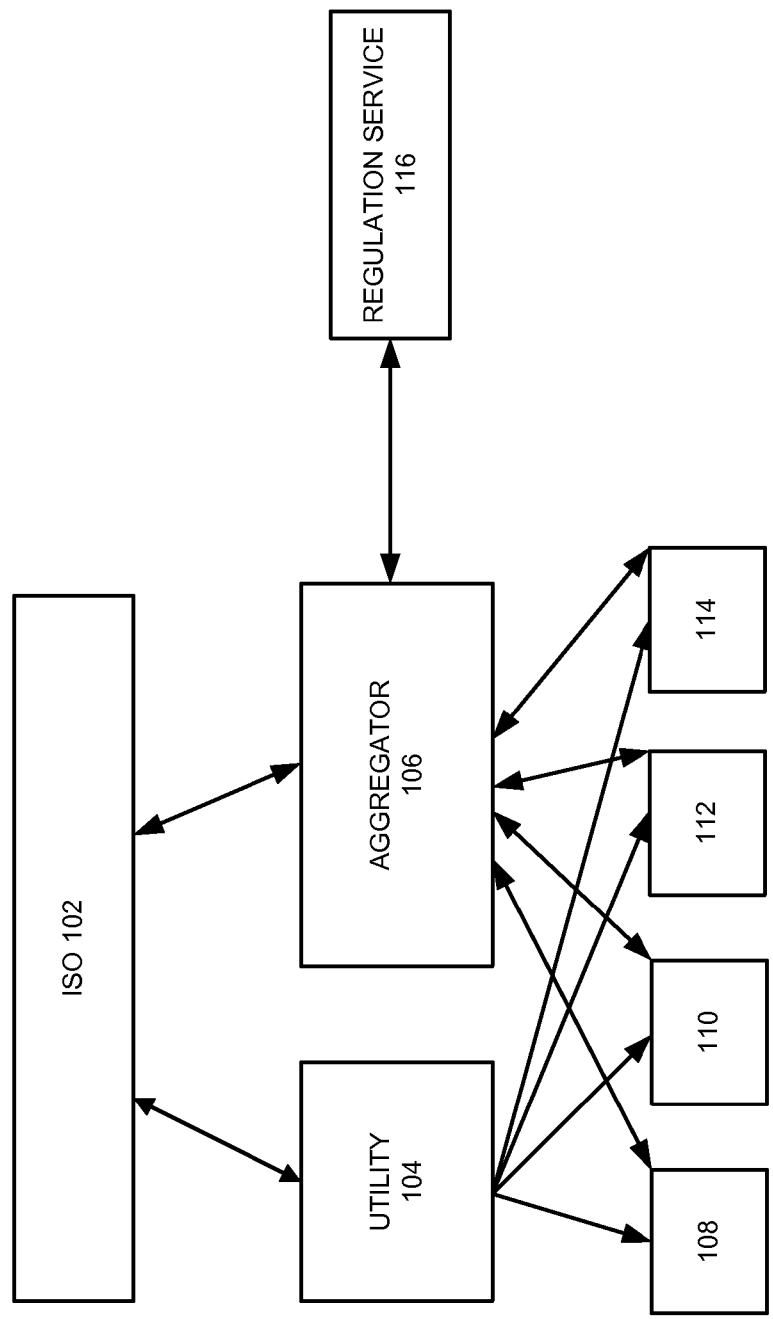
FIG. 1 presents a diagram illustrating an energy-imbalance stabilization system in accordance with one embodiment of the present invention.

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Overview

Embodiments of the present invention provide a system for resolving electrical grid demand/supply imbalance by simultaneously using both supply-side ancillary regulation service and demand-side fast demand response. By reducing the demand by end-use customers or shifting flexible loads to off-peak hours, the fast demand response (FDR) adds robustness to the grid, reduces energy costs and price volatility, and enables consumers to directly participate in the energy market and get paid for some of the most economically valuable services to the grid. During operation, a service aggregator tracks the imbalance signal by simultaneously managing the FDR and the supply-side regulation service. Depending on the economic mechanism used to reward the aggregator, the imbalance signal may be a direct measurement of an imbalance in the grid, or if the aggregator has agreed in advance to provide an ancillary service, the ISO may compute and send to the aggregator an imbalance signal, e.g., a price signal, to elicit, as needed, a prearranged aggregate response. In what follows we will use the term "imbalance signal" generally to refer to all possible sources of the signal. The aggregator uses a model predictive control (MPC) method to compute the control signal for controlling the FDR and the regulation service. The computation takes into account the constraints of both the FDR and the regulation service.

Aggregated Control Model

Regulation services have been traditionally relied upon by ISOs to match overall supply and demand in a power system. Typically, an ISO predicts the energy load, and uses optimizations and market mechanisms to arrange the required primary and ancillary regulation services provided by the supplier to successfully operate the power system. Although the supply-side regulation services can be used to mange the rapid fluctuations in the load, such services can be costly and slow, and can limit resource utilization.

In addition to regulation services, technologies to control consumer demand are under rapid development, thus enabling demand-side participation in resolving energy imbalance. Demand response augments the current grid architecture by providing demand-side ancillary service via cutbacks on residential energy use and shifts of flexible loads, such as dishwashers, washing machines, etc., to off-peak hours. In embodiments of the present invention, the system includes a controller which links a regulation service to fast demand response. By simultaneously controlling both the supply-side regulation service and the demand response, the system is able to stabilize energy imbalance rapidly at a lower cost.

FIG. 1 presents a diagram illustrating an energy-imbalance stabilization system in accordance with one embodiment of the present invention. Energy-imbalance stabilization system 100 includes an ISO 102, a utility company 104, an aggregator 106, a number of customers 108-114, and a regulation service provider 116. During operation, ISO 102 interacts with utility company 104, which provides power to customers 108-114. Aggregator 106 interfaces with customers 108-114, and provides aggregated demand response to ISO 102. In addition, aggregator 106 also interfaces with regulation service provider 116, and is thus able to control both the regulation service and the demand response from customers 108-114 in order to stabilize the energy imbalance.

However, combining the regulation service and the FDR can be challenging due to the different time scales used by the regulation service and the FDR. For example, the regulation service may accept update requests at a fast rate, such as every 4 seconds, whereas the FDR, due to communication limitations in some embodiments, may only accept update requests at a slower update rate, such as every 16 seconds. In addition, the regulation service and the FDR have different response speeds or ramp rates. The FDR typically can provide faster response than the regulation service. In embodiments of the present invention, a multi-rate, multi-variable control system is implemented in order to realize the simultaneous control of both the regulation service and the FDR.

Figure 2:
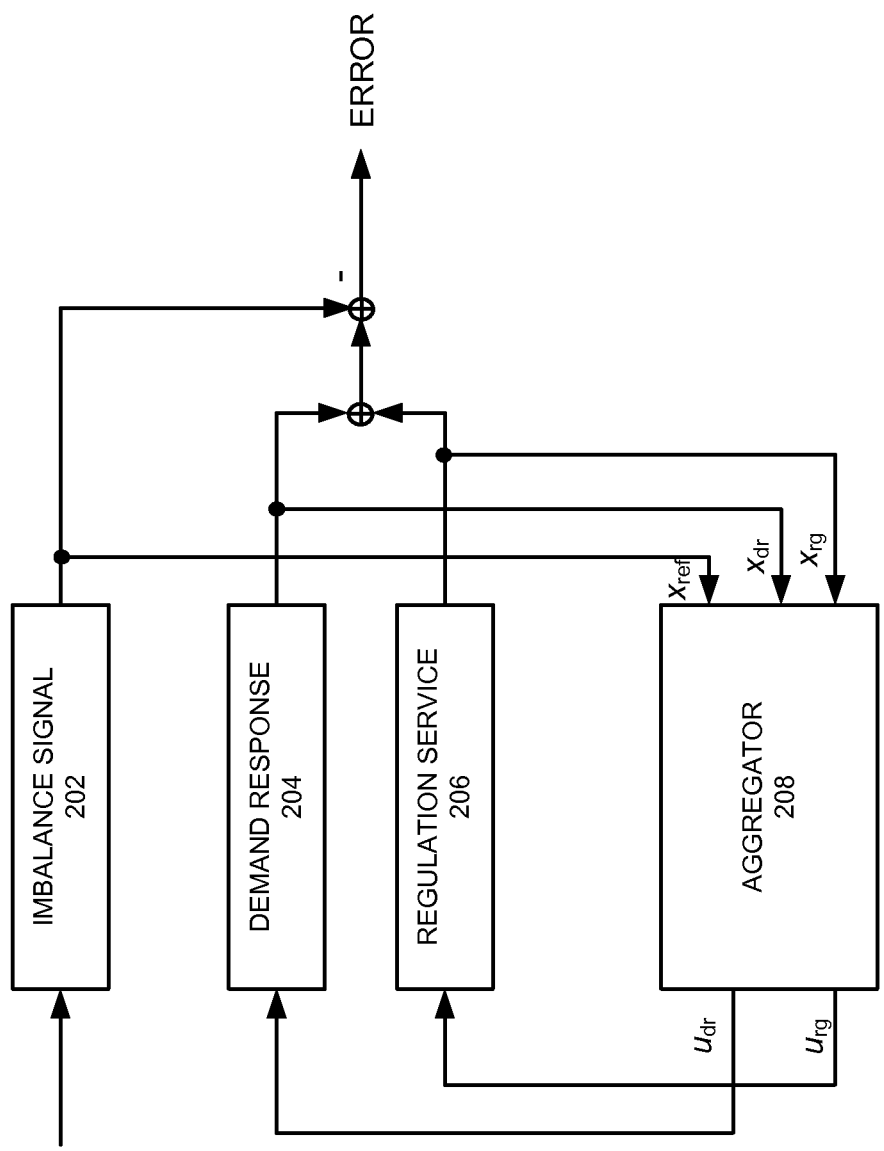
FIG. 2 presents a block diagram illustrating a control system that links both demand response and regulation service in accordance with an embodiment of the present invention.

FIG. 2 presents a block diagram illustrating a control system that links both demand response and regulation service in accordance with an embodiment of the present invention. Linked control system 200 includes a demand response subsystem 204, a regulation service subsystem 206, and an aggregator 208, which is a multi-input, multi-output controller. During operation, aggregator 208 receives three inputs: the state of reference (imbalance) signal 202 (denoted as $x_{ref}$); the state of demand response subsystem 204 (denoted as $x_{dr}$); and the state of regulation service subsystem 206 (denoted as $x_{rg}$). The output of aggregator 208 includes a control signal for demand response subsystem 204 (denoted as $u_{dr}$) and a control signal for regulation service subsystem 206 (denoted as $u_{rg}$).

The closed-loop, non-linear, time-varying system can be modeled as:

$$x_{ref}(t+1) = x_{ref}(t) + w(t)$$

$$x_{rg}(t+1) = f_{rg}(x_{rg}(t), u_{rg}(t), t)$$

$$x_{dr}(t+1) = f_{dr}(x_{dr}(t), u_{dr}(t), t)$$

$$y(t) = x_{ref}(t) - x_{rg}(t) - x_{dr}(t) \quad (1)$$

where w(t) is white noise used for modeling the random variation of imbalance signal 202, y(t) is the resulting error signal, and $f_{rg}(\cdot,\cdot,\cdot)$ and $f_{dr}(\cdot,\cdot,\cdot)$ are decoupled, non-linear functions which can be derived based on the system constraints.

A number of model constraints (e.g., capacity limitation, communication delays, etc.) can impede the performance of linked control system 200. In one embodiment of the present invention, the system takes into account a number of constraints, which include communication delay, customer disutility, mechanical wear-and-tear of appliance, and uncertainty of response, for demand response subsystem 204. The communication delay may arise in the communication network used between aggregator 208 and demand response subsystem 204. The customer disutility is one of the primary limitations of demand response subsystem 204, and it measures the amount of inconvenience to customers for energy reductions. For example, the amount of energy a customer would be willing to save by reducing his air condition usage during a hot summer will be limited by increasing disutility for indoor temperature increases. Aggregator 208 is responsible for limiting the total resource consumption by demand response subsystem 204. The mechanical wear-and-tear of appliance constraint limits the frequency with which aggregator 208 can send cutback signals to any single home, because excessive wear on appliances, especially those with a duty cycle, should be avoided. In one embodiment of the present invention, the mechanical wear-and-tear of appliance constraint is modeled by a limited total variation of the output of demand response subsystem 204. The uncertainty of response constraint results from a customer's ability to override the control signal from aggregator 208 at any time. Such ability is an essential component of demand response subsystem 204. As the population of demand response participants increases, so does the variance of this uncertainty.

In one embodiment of the present invention, the system further takes into account a number of constraints, which include maximum reserve capacity limitations and ramp rate, for regulation service subsystem 206. The maximum reserve capacity constraint indicates the amount of capacity a power plant has reduced its primary generation capacity to reserve capacity for regulation service subsystem 206. This constraint limits the peak value of the power output from regulation service subsystem 206. The ramp rate constraint exists because the large inertia of plant generators limits how quickly they can ramp up and ramp down in response to control signals from aggregator 208. This can be modeled by the constraint on the peak value of the control input for regulation service subsystem 206.

Although each constraint adds non-linear behavior to the dynamics of linked control system 200, it is possible to formulate the control system as a linear system with linear constraints. To model the linked system, a number of parameters are defined, including:

$\alpha_\infty, \beta_\infty$, which are maximum peak of regulation service and demand response, respectively. They equal the saturation point of maximum reserve capacity.

$\alpha_{rmp}$, which is the ramp rate constant for the regulation service. It is also the saturation point of the regulation input $u_{rg}$.

$\tau_{rg}, \tau_{dr}$, which are input hold rates of the regulation service and demand response, respectively. They define how often the control signals can be used to update these services.

In addition, a saturation function $sat_\alpha: R \rightarrow R$ is defined as:

$$sat_\alpha(z) = \begin{cases} -\alpha & \text{if } z < -\alpha \\ z & \text{if } |z| \leq \alpha \\ \alpha & \text{if } z > \alpha \end{cases} \quad (2)$$

where $\alpha > 0$, and R is a one-dimensional real vector space.
The Kronecker delta function $\delta: R \rightarrow R$ is defined as:

$$\delta(z) = \begin{cases} 1 & \text{if } z = 0 \\ 0 & \text{otherwise.} \end{cases} \quad (3)$$

Using the aforementioned parameter and functions, the state space model described by equation (1) can now be rewritten with more detail as:

$$x_{ref}(t+1) = x_{ref}(t) + w_{ref}(t)$$

$$x_{rg}(t+1) = sat_{\alpha_\infty}(x_{rg}(t) + \delta(t \bmod \tau_{rg})sat_{\alpha_{rmp}}(u_{rg}(t)))$$

$$x_{dr}(t+1) = sat_{\beta_\infty}(x_{dr}(t) + \delta(t \bmod \tau_{dr})(u_{dr}(t) + \sqrt{u_{dr}(t)w_{dr}(t)})) \quad (4)$$

Note that in Equation (4) the time-varying characteristic of the control signal $\delta(t \bmod \tau_{xx})u_{xx}(t) \neq 0$, where xx=dr or rg, only if t is a multiple of $\tau_{xx}$. Therefore, when $\tau_{rg} \neq \tau_{dr}$, the system effectively has control output which directs each subsystem at different rates. In one embodiment, it is assumed that $\tau_{rg} = c\tau_{dr}$, with c<1. As a result, demand response subsystem 204 receives control information from the aggregator c times less frequently than regulation service subsystem 206.

Figure 3:
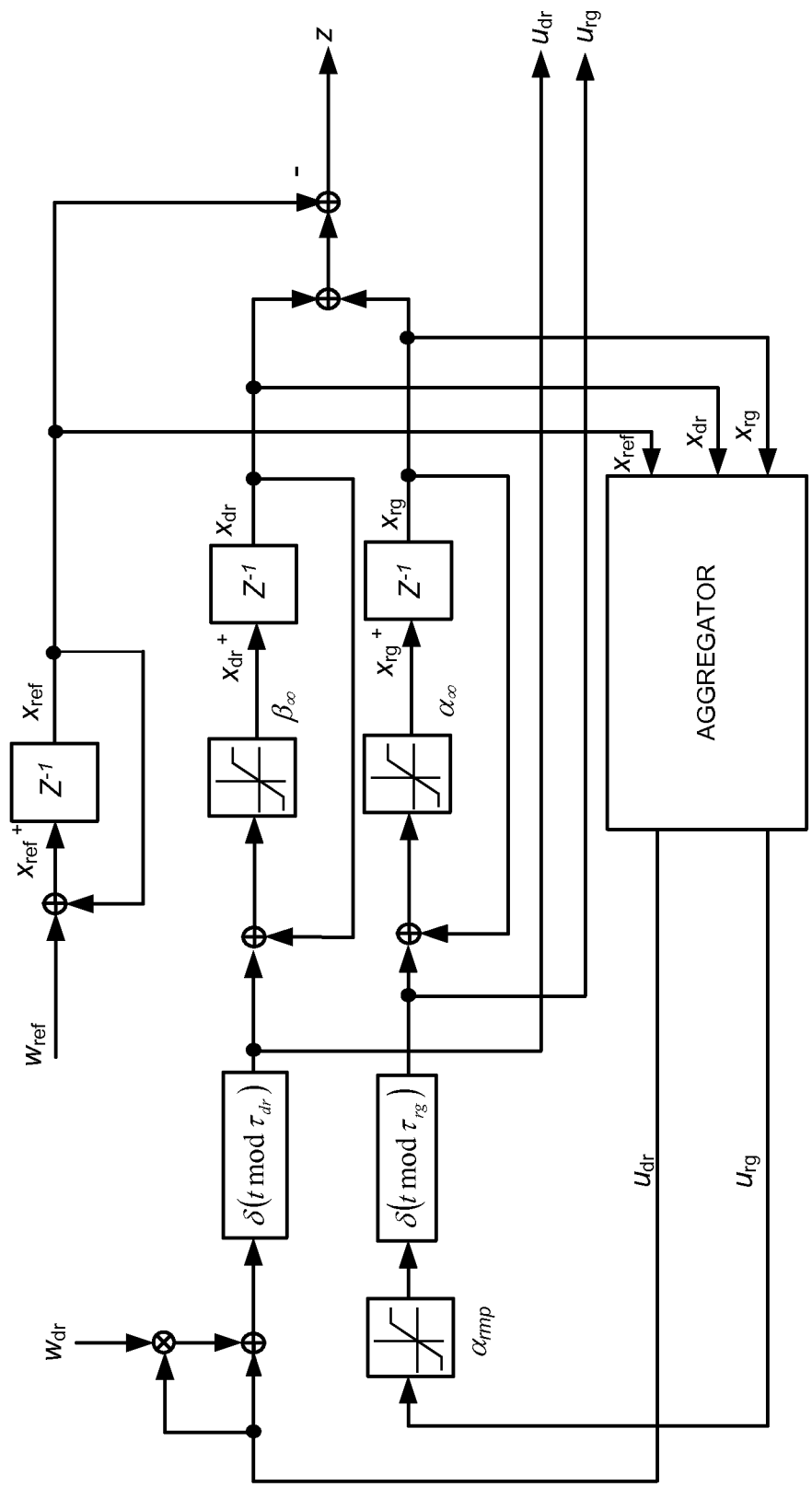
FIG. 3 presents a diagram illustrating a linked control system incorporating a number of constraints in accordance with an embodiment of the present invention.

FIG. 3 presents a diagram illustrating a linked control system incorporating a number of constraints in accordance with an embodiment of the present invention. In FIG. 3, $x_{ref}^+$, $x_{dr}^+$, and $x_{rg}^+$ refer to $x_{ref}(t+1)$, $x_{dr}(t+1)$, and $x_{rg}(t+1)$, respectively.

Model Predictive Control Scheme

Upon establishing the linked control system model, the next step is to design a model predictive control (MPC) scheme where at each time step the aggregator solves a planning problem which incorporates explicit knowledge of the system model and feedback information into its formulation. MPC is based on iterative, finite optimization of a plant model (here the linked control system model). At time t, the current plant state is sampled and a cost-minimizing control strategy is computed for a relatively short time horizon in the future: [t, t+T]. Specifically, an online or on-the-fly calculation is used to explore state trajectories that emanate from the current state and find a cost-minimizing control strategy until time t+T. Only the first step of the control strategy is implemented, then the plant state is sampled again and the calculations are repeated starting from the now current state.

To formulate the MPC planning problem, a number of performance metrics are used to measure the costs associated with each model constraint as listed below. For brevity, in the following text, we define the notation: $x_{xx} = [x_{xx}(1) \ x_{xx}(2) \ldots x_{xx}(T)]^T$, where T is the full horizon length of the simulation. One primary performance measure for the system is the Euclidean norm of the tracking error: $\|x_{ref} - x_{rg} - x_{dr}\|_2^2$, which is to be kept small. Note that the Euclidean norm for a vector $x = [x_1, x_2, \ldots, x_n]$ in an n-dimensional real vector space $R^n$ is captured by the formula: $\|x\|_2 := \sqrt{x_1^2 + x_2^2 + \ldots + x_n^2}$. The total resource consumption by the demand response is represented as proportional to its taxicab norm: $\|x_{dr}\|_1$, where the dominant cost derives from consumer disutility for off-normal operation. Note that the taxicab norm for a vector $x=[x_1, x_2, \ldots, x_n]$ in an n-dimensional real vector space $R^n$ is captured by the formula:

$$\|x\|_1 := \sum_{i=1}^{n} |x_i|.$$

Similarly, the total regulation resource consumption is represented via $\|x_{rg}\|_1$. The maximum peak of the regulation service and the demand response are expressed as their respective maximum norms: $\|x_{rg}\|_\infty$ and $\|x_{dr}\|_\infty$. Note that the maximum norm for a vector $x=[x_1, x_2, \ldots, x_n]$ in an n-dimensional real vector space $R^n$ is captured by the formula: $\|x\|_\infty := \max(|x_1|, |x_2|, \ldots, |x_n|)$. These maximum peaks restrict state trajectories because they cannot operate at full capacity. The total variation of demand response is denoted as: $\|x_{dr}\|_{TV}$, which is a secondary cost related to mechanical wear-and-tear of the load. The weighted input cost for regulation service and demand response are represented as: $\|u_{rg}\|_2$ and $\|u_{dr}\|_2$, respectively. The two last performance measures derive from the ramp rate constraints of the regulation service and the demand response, and are represented as: $\|u_{rg}\|_\infty$ and $\|u_{dr}\|_\infty$, respectively. Note these two ramp rate constraints limit the speed either subsystem can ramp-up and ramp-down.

Some of the aforementioned constraints are hard constraints, including the maximum peaks, the total variation of demand response, and the ramp rate constraints, while other constraints are soft constraints, including the tracking error, the consumer disutility, and the input cost.

The MPC scheme can be used to determine an optimal plan of action over a finite time horizon. When implementing MPC, the system updates the plan at each time step. In one embodiment of the present invention, the plan of action is determined by solving a convex optimization problem, which is explained in more detail below. Instead of viewing the reference (imbalance) signal as a state of the system, in one embodiment, the MPC scheme views the reference signal as a zero mean random walk that needs to be tracked. At any time $t$, the future values of $x_{ref}(\cdot)$ are unknown, so at each planning step, the system tracks $E[x_{ref}(\tau)|x_{ref}(t)]=x_{ref}(t)$ for $\tau=t, t+1, \ldots$. (It will be understood that other predictive models for the future values of $x_{ref}(\cdot)$ could be used in the optimization that follows; also our MPC framework, using both inputs and outputs, can allow for more complex models for the dynamics of the regulation and demand response, than first order saturated integrator models shown below.)

Combining the aforementioned performance measures and the linked control system model shown in FIG. 3, the aggregator needs to solve the following convex MPC planning optimization problem over a finite horizon $N$ at each time step $t=0, 1, 2, \ldots$:

$$\text{minimize} \begin{cases} \sum_{\tau=0}^{N} \|\hat{x}_{ref}(t) - \hat{x}_{rg}(\tau) - \hat{x}_{dr}(\tau)\|_2^2 + \\ \sum_{\tau=0}^{N} \rho_0 \|\hat{x}_{rg}(\tau)\|_1 + \rho_1 \|\hat{x}_{dr}(\tau)\|_1 + \sum_{\tau=0}^{N-1} \rho_2 \|\hat{u}_{rg}(\tau)\|_2^2 + \rho_3 \|\hat{u}_{dr}(\tau)\|_2^2 \end{cases},$$

subject to a number of constraints, including:

$$\hat{x}_{rg}(\tau+1) = \hat{x}_{rg}(\tau) + \delta((t+\tau) \bmod \tau_{rg}) \hat{u}_{rg}(\tau), \tau=0, \ldots, N-1;$$
$$\hat{x}_{rg}(0) = x_{rg}(t),$$

$$\hat{x}_{dr}(\tau+1) = \hat{x}_{rg}(\tau) + \delta((t+\tau) \bmod \tau_{dr}) \hat{u}_{dr}(\tau), \tau=0, \ldots, N-1;$$
$$\hat{x}_{dr}(0) = x_{dr}(t);$$

$$|\hat{x}_{rg}(\tau)| \le \alpha_\infty, \tau=0, \ldots, N;$$

$$|\hat{x}_{dr}(\tau)| \le \beta_\infty, \tau=0, \ldots, N;$$

$$|\hat{u}_{rg}(\tau)| \le \alpha_{rmp}, \tau=0, \ldots, N-1;$$

$$|\hat{u}_{dr}(\tau)| \le \beta_{rmp}, \tau=0, \ldots, N-1;$$

$$\sum_{\tau=0}^{N-1} |\hat{x}_{dr}(\tau+1) - \hat{x}_{dr}(\tau)| \le \beta_{TV};$$

where
$\hat{x}_{rg}(1), \ldots, \hat{x}_{rg}(N), \hat{x}_{dr}(1), \ldots, \hat{x}_{dr}(N), \hat{u}_{rg}(0), \ldots, \hat{u}_{rg}(N-1), \hat{u}_{dr}(0), \ldots, \hat{u}_{dr}(N-1)$ are unknown variables, and $x_{ref}(t), \tau_{rg}, \tau_{dr}, \alpha_\alpha, \beta_\infty, \rho_0, \rho_1, \rho_2, \rho_3$ and the initial states $x_{rg}(t), x_{dr}(t)$ are given data. Note that $\rho_0, \rho_1, \rho_2, \rho_3$ are tunable weight functions associated with the total resource consumption by the regulation, demand response (the consumer disutility), the input cost of the regulation service, and the input cost of the demand response, respectively.

Note that instead of being soft constraints, which are included as additional terms to the tracking error in the function to be minimized, the consumer disutility, the regulation cost, the input cost of the regulation service, and the input cost of the demand response can also be introduced as hard constraints. That is, they can be the absolute condition to be subjected to. Similarly, the maximum peaks and the ramp rates constraints can also be introduced as soft constraints, i.e., they can be included as additional terms in the function to be minimized. Here we have represented the ramp rate constraints as slew-rate limits on the inputs; they could just as well be represented as direct rate limits on the state variables $x_{rg}(t), x_{dr}(t)$. In addition, the optimization problem can be expressed in other forms, as long as it takes into consideration both the regulation service and the demand response. For example, the first summation in the objective function of the optimization problem above penalizes tracking error, while the second and third summations are meant to capture the input and output costs of the regulation and the fast demand response. Our choice of using the taxicab and Euclidean norms to represent those costs are primarily for illustrative and computational convenience. One skilled in the power systems art will understand that many other choices are possible for capturing the costs of regulation and demand response, depending on the generation resource being used; while one skilled in the art of optimization will understand that many other choices are possible as metrics of tracking error. Although these other choices of cost and tracking metrics might change some of the computational properties of the optimization problem (eg: convexity), they will still fall within the general framework here of optimizing an objective function with terms representing power costs of regulation and demand response, and terms representing an imbalance or tracking error metric (or price signal, as shown below).

Furthermore, in the scenario where the aggregator is operating off a market price signal $\lambda(t)$ rather than a direct reference signal $x_{ref}(t)$, the aggregator would instead to solve the following convex MPC planning optimization problem over a finite horizon $N$ at each time step $t=0, 1, 2, \ldots$:

$$\text{minimize} \begin{cases} \sum_{\tau=0}^{N} -\hat{\lambda}(\tau)(\hat{x}_{rg}(\tau) + \hat{x}_{dr}(\tau)) + \\ \sum_{\tau=0}^{N} \rho_0 \|\hat{x}_{rg}(\tau)\|_1 + \rho_1 \|\hat{x}_{dr}(\tau)\|_1 + \sum_{\tau=0}^{N-1} \rho_2 \|\hat{u}_{rg}(\tau)\|_2^2 + \rho_3 \|\hat{u}_{dr}(\tau)\|_2^2 \end{cases},$$

subject to a number of constraints, including:

$\hat{x}_{rg}(\tau+1) = \hat{x}_{rg}(\tau) + \delta((t+\tau) \bmod \tau_{rg})\hat{u}_{rg}(\tau), \tau=0, \ldots, N-1;$
$\hat{x}_{rg}(0) = x_{rg}(t),$ $\hat{x}_{dr}(\tau+1) = \hat{x}_{dr}(\tau) + \delta((t+\tau) \bmod \tau_{dr})\hat{u}_{dr}(\tau), \tau=0, \ldots, N-1;$
$\hat{x}_{dr}(0) = x_{dr}(t);$ $|\hat{x}_{rg}(\tau)| \leq \alpha_\infty, \tau=0, \ldots, N;$ $|\hat{x}_{dr}(\tau)| \leq \beta_\infty, \tau=0, \ldots, N;$ $|\hat{u}_{rg}(\tau)| \leq \alpha_{rmp}, \tau=0, \ldots, N-1;$ $|\hat{u}_{dr}(\tau)| \leq \beta_{rmp}, \tau=0, \ldots, N-1;$ $$\sum_{\tau=0}^{N-1} |\hat{x}_{dr}(\tau+1) - \hat{x}_{dr}(\tau)| \leq \beta_{TV}$$

where $\hat{\lambda}(\tau), \tau=0, \ldots, N$ is the market price signal, with $\hat{\lambda}(0) = \lambda(t)$, and the other constants and variables are as defined earlier. This price signal could come from market clearing price, internal or external price forecasts, previously agreed upon contracts, day-ahead/hour-ahead markets, or other market mechanisms. In this formulation, the objective function is minimizing the difference between the cost of regulation and demand response, captured in the second two summations, and the revenue, captured in the first summation. Minimizing this difference between cost and revenue is equivalent to maximizing profit, which is defined as revenue minus cost. This second objective formulation can be derived from the first using the standard economics method, of appending the market clearing constraint (demand=supply) to the objective in the first formulation, and then applying duality to obtain the usual producer and consumer subproblems. The objective in our second formulation is equivalent to producer subproblem, namely that of profit maximization. Lastly, note that our framework can be used within a more general framework that considers other constraints and costs such as fuel, minimum up/down time constraints, startup/shutdown costs, as well as prices for other services, such as spinning and nonspinning reserve, regular operating costs, consumer and appliance utility and discomfort, etc. One skilled in the art will note that both MPC planning optimization problems above, the direct reference-based as well as the indirect price-based, can be cast as quadratic programming problems, with linear constraints, which can be solved efficiently and to global optimality.

Figure 4:
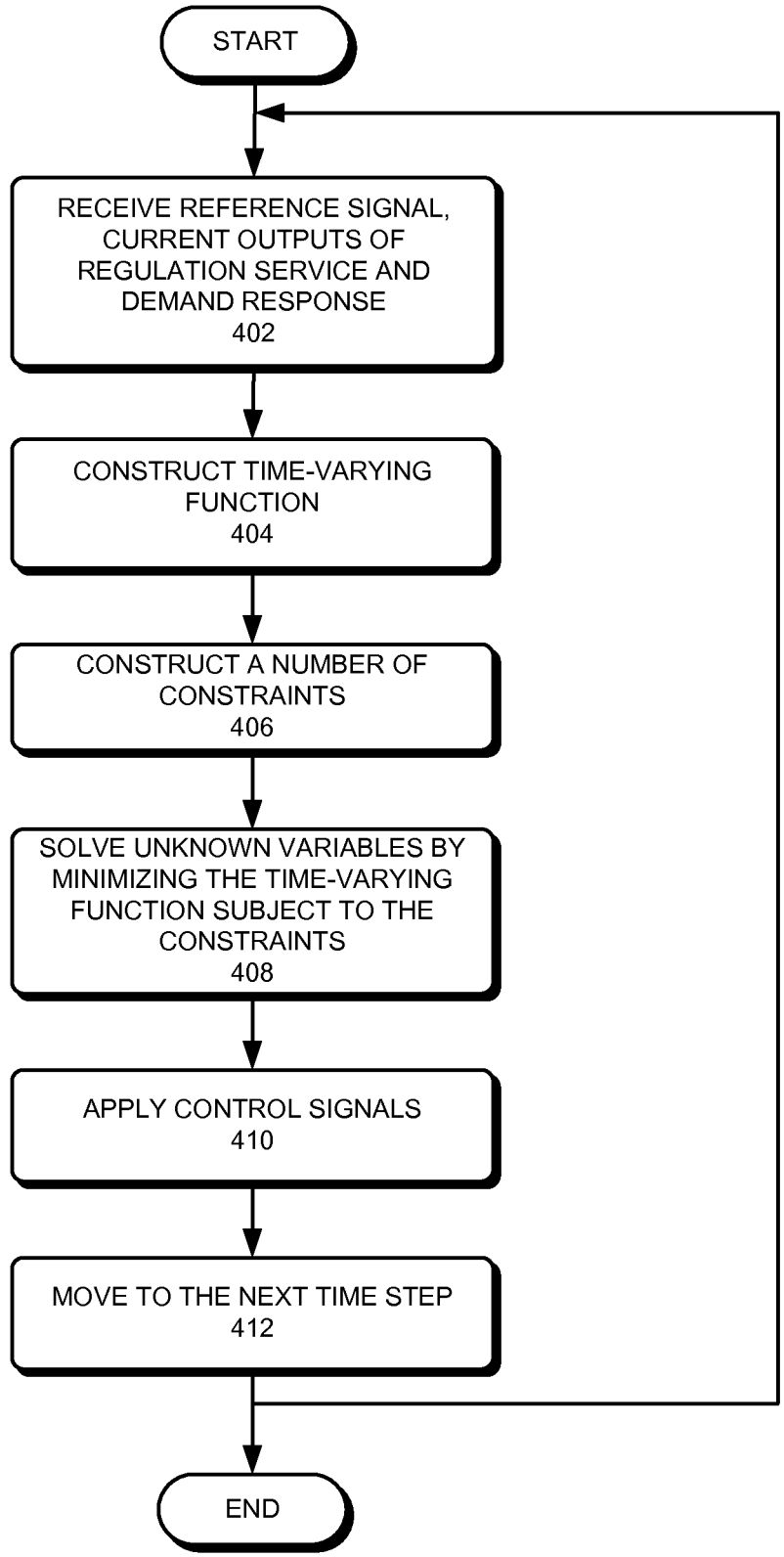
FIG. 4 presents a flowchart illustrating an exemplary process of implementing the model predictive control (MPC) scheme for the linked control system in accordance with an embodiment of the present invention.

Upon solving the MPC planning problem, the aggregator can select control signals $u_{xx}^{mpc}(t) = \hat{u}_{xx}(0)$. The closed-loop system with the MPC inputs will evolve as:

$x_{ref}(t+1) = x_{ref}(t) + w(t)$ $x_{rg}(t+1) = x_{rg}(t) + \delta(t \bmod \tau_{rg})u_{rg}^{mpc}(t)$ $x_{dr}(t+1) = x_{dr}(t) + \delta(t \bmod \tau_{dr})u_{dr}^{mpc}(t)$ $y(t) = x_{ref}(t) - x_{rg}(t) - x_{dr}(t)$ FIG. 4 presents a flowchart illustrating an exemplary process of implementing the model predictive control (MPC) scheme for the linked control system in accordance with an embodiment of the present invention. During operation, the system receives a time-varying reference signal (the imbalance signal), the current output of the regulation service, and the current output of the demand response (operation 402). Subsequently, the system constructs a time-varying function over a predefined time period using the reference signal, the current outputs of the demand response and regulation service, and the future outputs of the regulation service and demand response, which are unknown variables (operation 404). In one embodiment, the time-varying function includes control signals, which are also unknown variables, to the regulation service and demand response. The system then constructs a number of constraints (operation 406). The constraints include, but are not limited to: the input hold rates of the regulation service and demand response, the maximum peak of the regulation service and the demand response, the maximum ramp rates of the regulation service and demand response, and the maximum variation of the demand response. Subsequently, the system solves the unknown variables, including control signals to the regulation service and the demand response, by minimizing the time-varying function subject to the constraints (operation 408). Next, the system applies the control signals to the regulation service and demand response (operation 410). The system then moves to the next time step (operation 412), and returns to operation 402.

Simulation Result

Figure 5A:
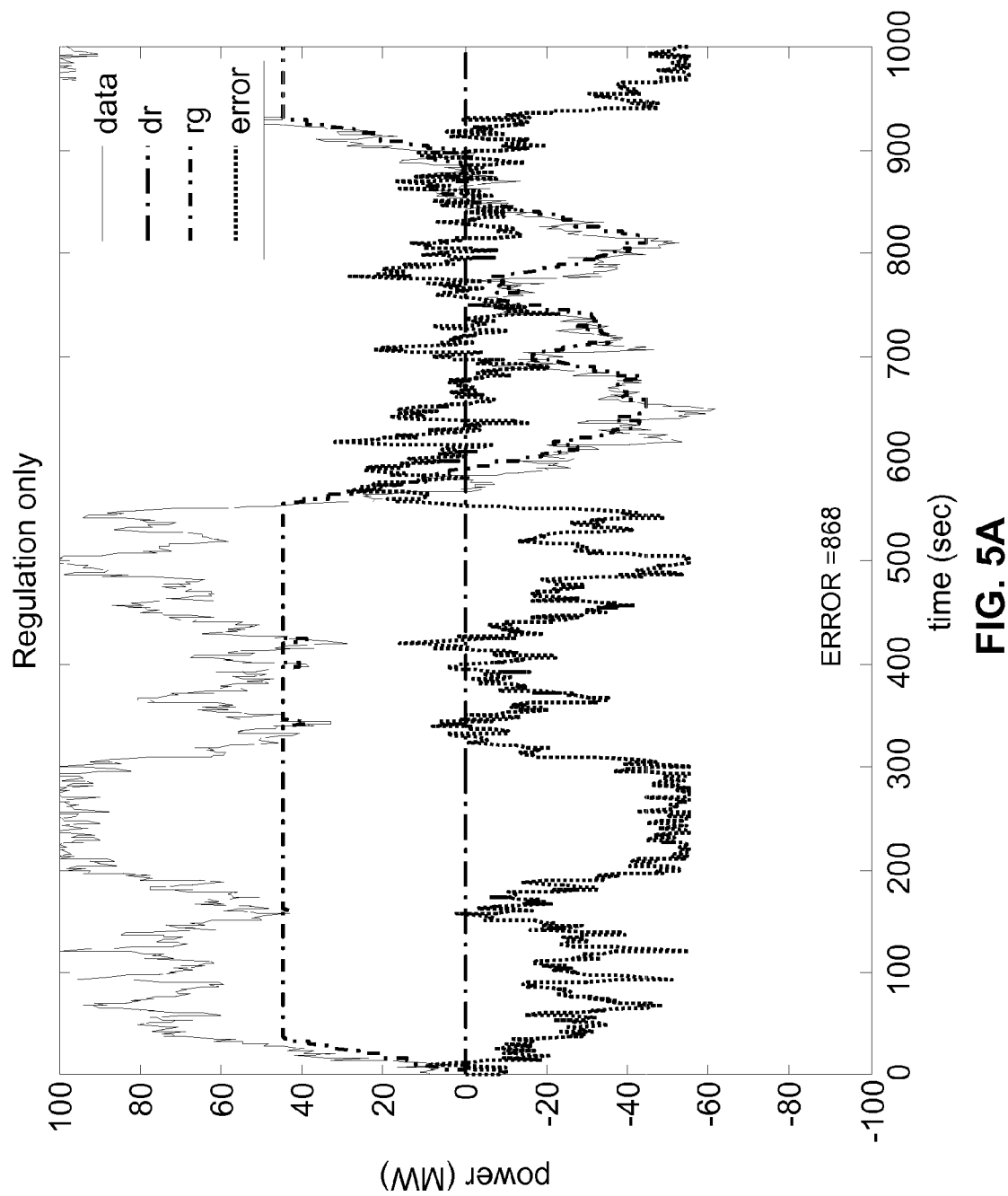
FIG. 5A presents a diagram illustrating an exemplary simulation result based on the MPC model without using the demand response in accordance with an embodiment of the present invention.
Figure 5B:
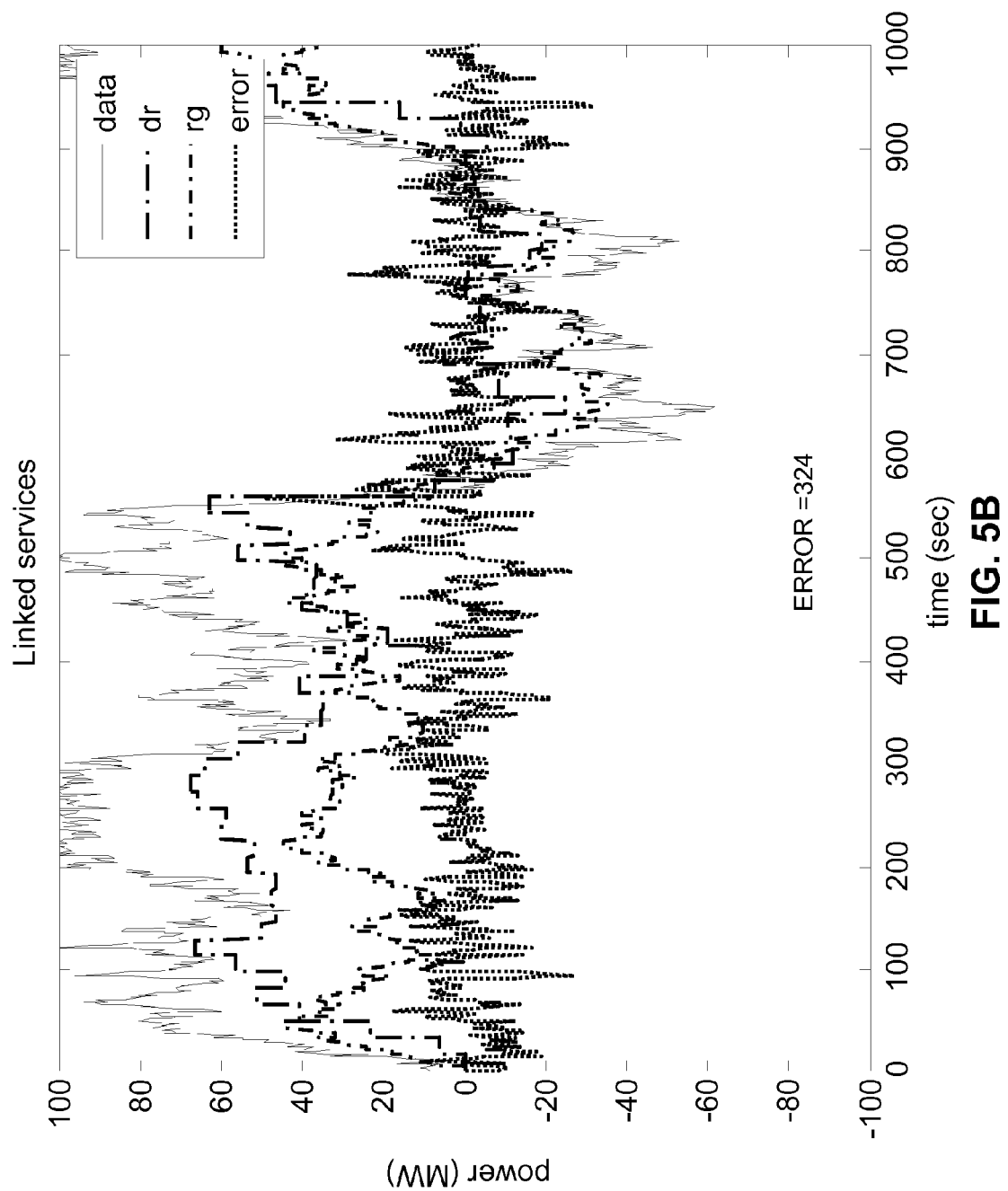
FIG. 5B presents a diagram illustrating an exemplary simulation result based on the MPC model using both the regulation service and the demand response in accordance with an embodiment of the present invention.

To demonstrate that the linked control system can outperform a system that uses regulation service only, simulations are performed, and the results are presented in FIGS. 5A and 5B. Table 1 presents the nominal simulation parameters.

TABLE 1

| Parameter | Value |
| --- | --- |
| $\alpha_\infty$ | 45 mw |
| $\beta_\infty$ | 100 mw |
| $\alpha_{rmp}$ | 6 mw |
| $\beta_{rmp}$ | $\infty$ |
| $\alpha_{res}$ | N/A |
| $\beta_{TV}$ | $\infty$ |
| $\tau_{rg}$ | 4 sec |
| $\tau_{dr}$ | 16 sec |

FIG. 5A presents a diagram illustrating an exemplary simulation result using the MPC model without using the demand response in accordance with an embodiment of the present invention. This was obtained with $\beta_\infty = 0$; $\rho_1, \rho_2, \rho_3$ held very small; and appropriate tuning of $\rho_0$. In FIG. 5A, the solid line (data) is the imbalance signal, the dashed lines are outputs from the demand response and the regulation service, respectively, and the dotted line is the tracking error. From FIG. 5A, one can see that, without the participation of the demand response (its output is shown to be zero), the system performance is limited by the capacity limitation of the regulation service, whose output is cutoff at around 45 mw.

FIG. 5B presents a diagram illustrating an exemplary simulation result using the MPC model using both the regulation service and the demand response in accordance with an embodiment of the present invention. This was obtained with $\alpha_\infty, \beta_\infty \neq 0$ as in Table 1; and $\rho_0 = \rho_2 = \rho_3$ held very small; and appropriate tuning of $\rho_1$. In FIG. 5B, the solid line (data) is the imbalance signal, the dashed lines are outputs from the demand response and the regulation service, respectively, and the dotted line is the tracking error. From FIG. 5B, one can see that, the demand response, although at a slower rate, complements the regulation service in terms of tracking the imbalance signal (data). As a result, the tracking performance is improved by more than 60% (the integrated error goes down from 868 to 324).

Figure 6:
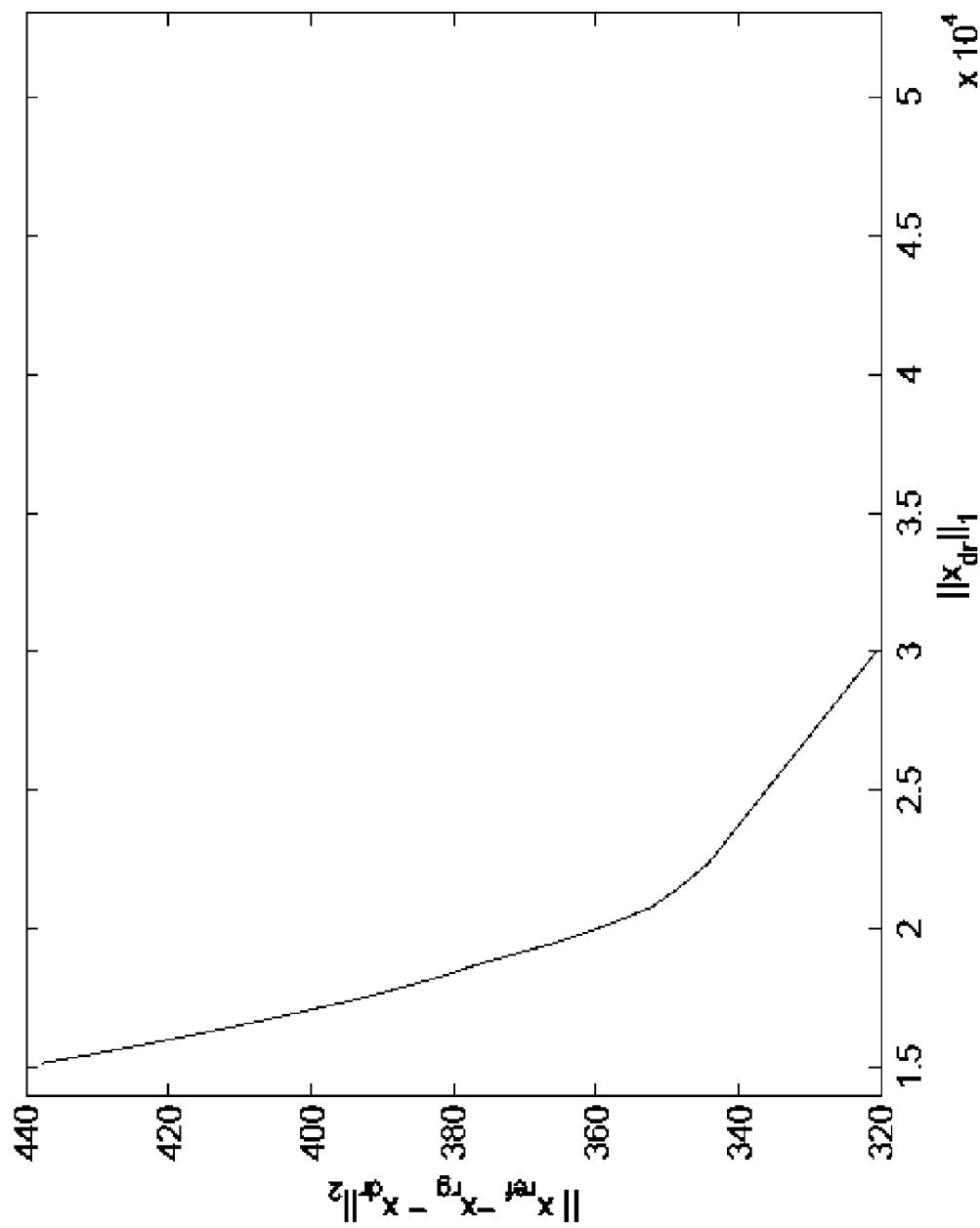
FIG. 6 presents an exemplary Pareto optimal tradeoff curve between tracking error and total resource consumption by the demand response in accordance with an embodiment of the present invention.

FIG. 6 presents an exemplary Pareto optimal tradeoff curve between tracking error and the total resource consumption by the demand response in accordance with an embodiment of the present invention. In FIG. 6, the horizontal axis is the resource consumption of the demand response ($\|x_{dr}\|_1$), and the vertical axis is the tracking error ($\|x_{ref}-x_{rg}-x_{dr}\|_2$). As one can see, the resource consumed by the demand response increases as the tracking error decreases. This curve defines the limits of performance of the MPC control system, and can be used as a benchmark for measuring the performance of other controllers. As an example, the curve shown in FIG. 6 is generated by solving the previously mentioned convex optimization problem with $\rho_1 \in [1\times10^{-8}, 10]$ and $\rho_0=0$; $\rho_2=\rho_3=1\times10^8$.

Computer and Communication System

Figure 7:
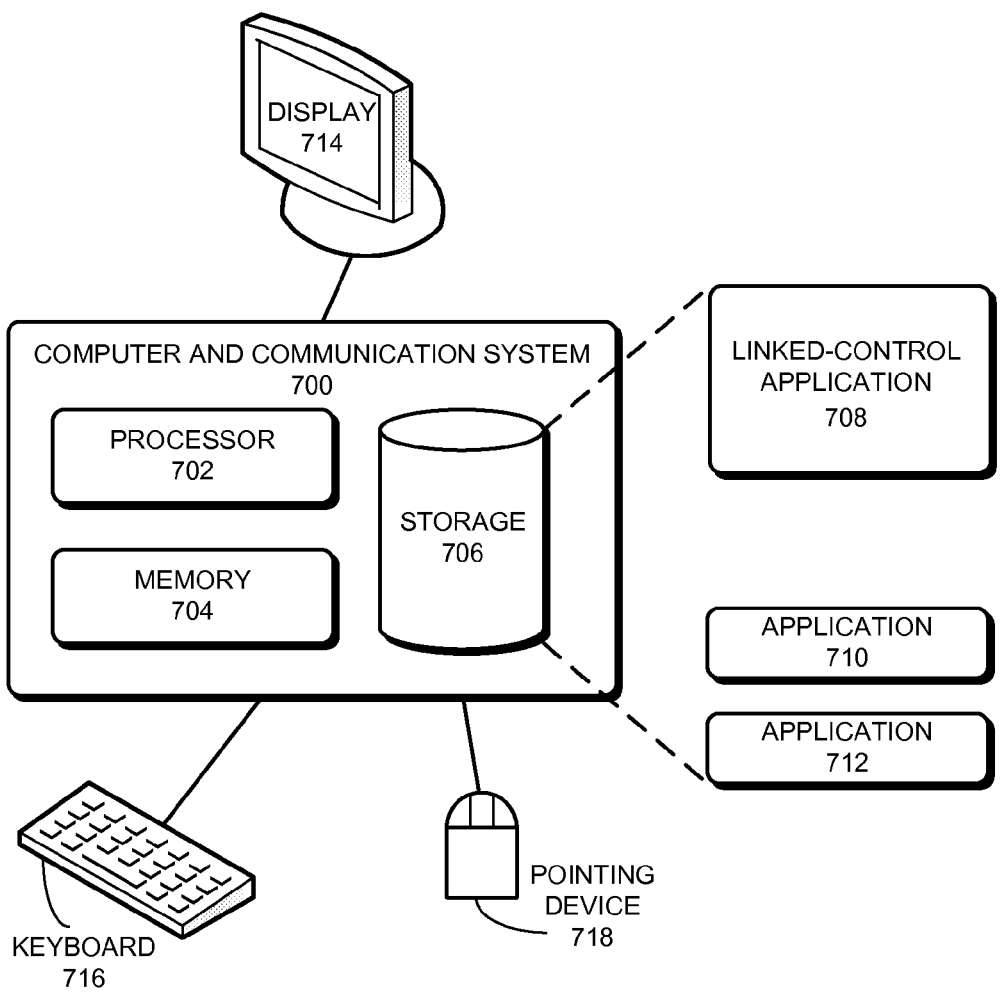
FIG. 7 presents an exemplary computer system for facilitating implementation of a linked control system in accordance with an embodiment of the present invention.

FIG. 7 presents an exemplary computer system for facilitating implementation of a linked control system in accordance with an embodiment of the present invention. In FIG. 7, a computer and communication system 700 includes a processor 702, a memory 704, and a storage device 706. Storage device 706 stores programs to be executed by processor 702. Specifically, storage device 706 stores a linked-control application 708, as well as other applications, such as applications 710 and 712. During operation, linked-control application 708 is loaded from storage device 706 into memory 704 and then executed by processor 702. While executing the program, processor 702 performs the aforementioned functions. Computer and communication system 700 is coupled to an optional display 714, keyboard 716, and pointing device 718.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for resolving energy imbalance within an electrical grid, comprising:
   receiving an imbalance signal;
   receiving current outputs from a regulation service subsystem and a demand response subsystem;
   generating future control signals for controlling future outputs of the regulation service subsystem and the demand response subsystem based on the imbalance signal and the current outputs, wherein generating the future control signals involves implementing a model predictive control (MPC) scheme for minimizing a time-varying function subject to a number of constraints, wherein a respective constraint includes a first input hold rate of the regulation service subsystem and a second input hold rate of the demand response subsystem, and wherein the first input hold rate of the regulation service subsystem is less than the second input hold rate of the demand response subsystem; and
   applying the generated future control signals to the regulation service subsystem and the demand response subsystem.

2. The method of claim 1,
   wherein the time-varying function is constructed over a predetermined time horizon based on the imbalance signal, the future outputs from the regulation service subsystem and the demand response subsystem, and the future control signals for the regulation service subsystem and the demand response subsystem; and
   wherein the number of constraints are associated with the future outputs and the future control signals.

3. The method of claim 2, wherein the time-varying function includes a negative revenue function, computed as a negative product of a time-varying price signal with sum of the future outputs of the regulation service subsystem and the demand response subsystem.

4. The method of claim 2, wherein the time-varying function includes a tracking error corresponding to a difference between the imbalance signal and a sum of the future outputs of the regulation service subsystem and the demand response subsystem.

5. The method of claim 4, wherein the time-varying function further includes one or more of:
   a total resource consumption of the regulation service subsystem and the demand response subsystem, which corresponds to the future outputs of the regulation service subsystem and the demand response-subsystem;
   a weighted input cost of the regulation service subsystem, which corresponds to a weighted control signal for the regulation service subsystem; and
   a weighted input cost of the demand response subsystem, which corresponds to a weighted control signal for the demand response subsystem.

6. The method of claim 2, wherein the constraints further include one or more of the following:
   maximum outputs of the regulation service subsystem and the demand response subsystem;
   maximum values of the control signals for the regulation service subsystem and the demand response subsystem;
   a total resource consumption of the demand response subsystem;
   input costs of the regulation service subsystem and the demand response subsystem; and
   a total variation of future outputs of the demand response subsystem.

7. The method of claim 6, wherein the maximum values of the control signals correspond to maximum ramp rates of the regulation service subsystem and the demand response subsystem.

8. A system for resolving energy imbalance within an electrical grid, comprising:
- a regulation service subsystem;
- a demand response subsystem; and
- an aggregator configured to:
  - receive an imbalance signal;
  - receive current outputs from the regulation service subsystem and the demand response subsystem;
  - generate future control signals for controlling future outputs of the regulation service subsystem and the demand response subsystem based on the imbalance signal and the current outputs, wherein generating the future control signals involves implementing a model predictive control (MPC) scheme for minimizing a time-varying function subject to a number of constraints, wherein a respective constraint includes a first input hold rate of the regulation service subsystem and a second input hold rate of the demand response subsystem, and wherein the first input hold rate of the regulation service subsystem is less than the second input hold rate of the demand response subsystem; and
  - apply the generated future control signals to the regulation service subsystem and the demand response subsystem.

9. The system of claim 8,
- wherein the time-varying function is constructed over a predetermined time horizon based on the imbalance signal, the future outputs from the regulation service subsystem and the demand response subsystem, and the future control signals for the regulation service subsystem and the demand response subsystem; and
- wherein the number of constraints are associated with the unknown future outputs and the future control signals.

10. The system of claim 9, wherein the time-varying function includes a tracking error corresponding to a difference between the imbalance signal and a sum of the future outputs of the regulation service subsystem and the demand response subsystem.

11. The system of claim 10, wherein the time-varying function further includes one or more of:
- a total resource consumption of the regulation service subsystem and the demand response subsystem, which corresponds to the future outputs of the regulation service subsystem and the demand response subsystem;
- a weighted input cost of the regulation service subsystem, which corresponds to a weighted control signal for the regulation service subsystem; and
- a weighted input cost of the demand response subsystem, which corresponds to a weighted control signal for the demand response subsystem.

12. The system of claim 9, wherein the constraints further include one or more of the following:
- maximum outputs of the regulation service subsystem and the demand response subsystem;
- maximum values of the control signals for the regulation service subsystem and the demand response subsystem;
- a total resource consumption of the demand response subsystem;
- input costs of the regulation service subsystem and the demand response subsystem; and
- a total variation of future outputs of the demand response subsystem.

13. The system of claim 12, wherein the maximum values of the control signals correspond to maximum ramp rates of the regulation service subsystem and the demand response subsystem.

14. A non-transitory computer-readable storage medium storing instructions that when executed by a computer cause the computer to perform a method, the method comprising:
- receiving an imbalance signal;
- receiving current outputs from a regulation service subsystem and a demand response subsystem;
- generating future control signals for controlling future outputs of the regulation service subsystem and the demand response subsystem based on the imbalance signal and the current outputs, wherein generating the future control signals involves implementing a model predictive control (MPC) scheme for minimizing a time-varying function subject to a number of constraints, wherein a respective constraint includes a first input hold rate of the regulation service subsystem and a second input hold rate of the demand response subsystem, and wherein the first input hold rate of the regulation service subsystem is less than the second input hold rate of the demand response subsystem; and
- applying the generated future control signals to the regulation service subsystem and the demand response subsystem.

15. The computer-readable storage medium of claim 14,
- wherein the time-varying function is constructed over a predetermined time horizon based on the imbalance signal, the future outputs from the regulation service subsystem and the demand response subsystem, and the future control signals for the regulation service subsystem and the demand response subsystem; and
- wherein the number of constraints are associated with the future outputs and the future control signals.

16. The computer-readable storage medium of claim 15, wherein the time-varying function includes a tracking error corresponding to a difference between the imbalance signal and a sum of the outputs of the regulation service subsystem and the demand response subsystem.

17. The computer-readable storage medium of claim 16, wherein the time-varying function further includes one or more of:
- a total resource consumption of the regulation service subsystem and the demand response subsystem, which corresponds to the future outputs of the regulation service subsystem and the demand response subsystem;
- a weighted input cost of the regulation service subsystem, which corresponds to a weighted control signal for the regulation service subsystem; and
- a weighted input cost of the demand response subsystem, which corresponds to a weighted control signal for the demand response subsystem.

18. The computer-readable storage medium of claim 15, wherein the constraints further include one or more of the following:
- maximum outputs of the regulation service subsystem and the demand response subsystem;
- maximum values of the control signals for the regulation service subsystem and the demand response subsystem;
- a total resource consumption of the demand response subsystem;
- input costs of the regulation service subsystem and the demand response subsystem; and
- a total variation of future outputs of the demand response subsystem.

19. The computer-readable storage medium of claim 18, wherein the maximum values of the control signals correspond to maximum ramp rates of the regulation service subsystem and the demand response subsystem.

* * * * *